Aug. 18, 1931.  M. H. GYSLING  1,819,553
RETAINING DEVICE FOR PIPE COVERINGS
Filed May 24, 1930
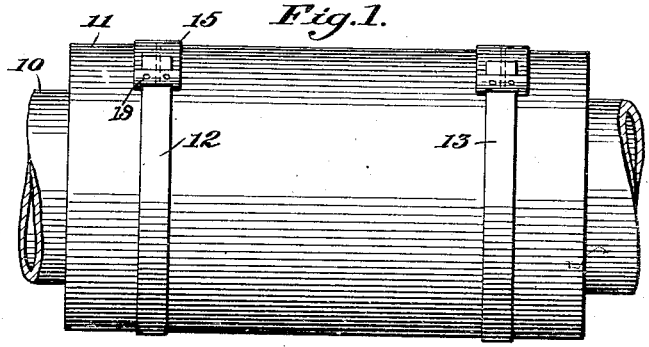
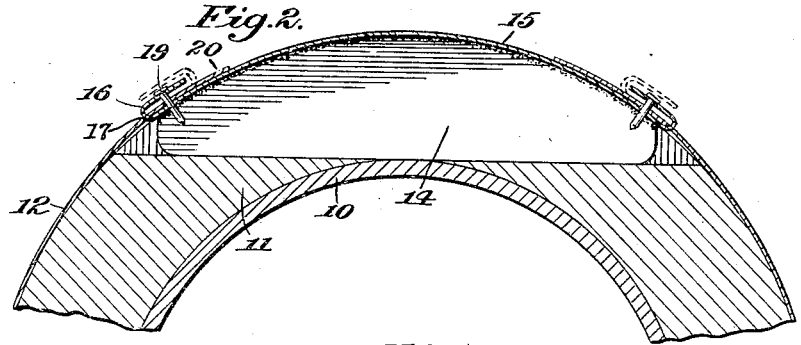
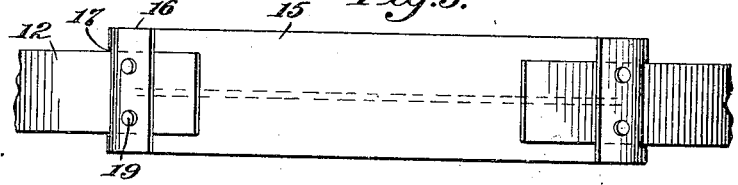
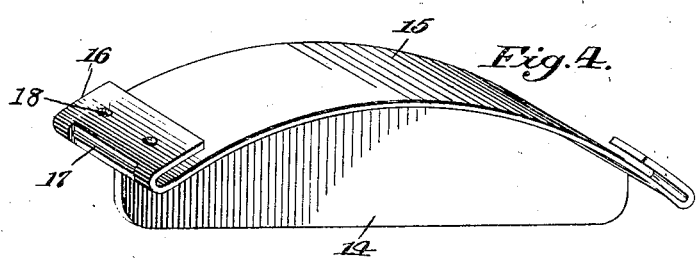
Inventor:
Manuel H. Gysling,
Morrison, Kennedy & Campbell
Attys.

Patented Aug. 18, 1931

1,819,553

UNITED STATES PATENT OFFICE

MANUEL H. GYSLING, OF NORTH TONAWANDA, NEW YORK, ASSIGNOR TO AMERICAN DISTRICT STEAM COMPANY, OF NORTH TONAWANDA, NEW YORK, A CORPORATION OF NEW YORK

RETAINING DEVICE FOR PIPE COVERINGS

Application filed May 24, 1930. Serial No. 455,345.

This invention relates to retaining devices for pipe covering and comprises a device which will prevent the covering from sagging away from the pipe and from otherwise becoming deformed.

It is the usual practice in heat engineering to surround hot water and steam pipes with various types of insulating material to prevent loss of heat by radiation. In order that the insulation be held securely in place around the pipe, it is customary to surround the insulation at convenient distances along the pipe with metallic straps. Such retaining means have, in general, been found satisfactory but there is a tendency, particularly when the pipes are not in use, for the insulation, by reason of absorption of moisture or other causes, to sag or belly away from the lower portion of the pipe, thus imposing a strain on the lower portion of the retaining straps and causing the portion of the straps which extend over the upper side of the pipe to compress and in many instances to gradually cut through the insulation at that point. In other words, there is a tendency for the insulation in part to compress and in part to shift radially with respect to the pipe.

The present invention is directed particularly to the elimination of the objectionable features of conventional pipe insulation retaining devices and comprises a retaining means which will secure insulation to a pipe in such manner that the insulation will not pull away from the pipe and which is of such construction that the insulation will not be distorted, compressed or otherwise injured thereby.

The essential feature of the present invention consists in the provision of a member preferably in the form of a strap extending circumferentially of the insulation to retain the insulation in close proximity with the pipe around its circumference and in combination therewith means which, for convenience, I have designated a positioning member, associated with both the retaining member and the pipe and adapted to prevent radial movement with respect to the pipe of the retaining member and of the insulation which is held in position on the pipe by the retaining member. Preferably the positioning member consists of a rigid plate seating on the pipe vertically thereto and extending through the insulation to the surface to form a seat against which the retaining strap will bear, thus relieving the insulation of the portion of the weight of the insulation borne by the strap and also of the resulting compressing effect of the strap on the insulation.

Besides providing means for conveniently positioning the insulation securing strap with respect to the pipe, it is within the contemplation of this invention to provide means in connection with the positioning member for conveniently securing the ends of the straps in such a manner that they can not easily pull away from the insulation and, further, to present a construction whereby, when necessary, the ends of the straps may be conveniently disengaged from the positioning member for the purpose of tightening or loosening the strap in accordance with changes in the diameter of the insulation due to atmospheric or other conditions.

Having briefly pointed out the general nature of my invention, I will now proceed to describe its details of construction, reference being had to the accompanying drawings. It is to be understood that the embodiments of my invention shown in the drawings are merely illustrative and that although my device is simple it is capable of a considerable range of modification and equivalency without in the least departing from the spirit thereof, so that I do not intend to limit myself to the details of construction therein shown. Furthermore, while in this specification and the appended claims I have used the term "insulation" to refer to the nature of the material surrounding a pipe adapted to convey a heated medium, it is clear that my inventive structure may be utilized equally well for the purpose of retaining any type of covering on any pipe or other similar structure.

In these drawings,

Fig. 1 is a plan view showing a section of pipe surrounded by an insulated covering retained in place by the usual supporting straps in connection with the retaining device which constitutes my invention;

Fig. 2 is a cross sectional view of a section of insulated pipe similar to that shown in Fig. 1, showing the details of construction of my retaining device and the manner in which it is associated with the pipe and the insulation. It also shows the manner in which the ends of the supporting strap are anchored to my retaining device;

Fig. 3 is a top view of my inventive structure corresponding to the disclosure in Fig. 2;

Fig. 4 is a view in perspective showing the general shape and arrangement of the various parts of my invention.

Referring now to the drawings, in Fig. 1, I have shown a section of pipe 10, surrounded by a non-rigid covering or casing 11, which will usually comprise a heat insulating material. Extending circumferentially about the insulation at convenient intervals are retaining straps such as shown at 12 and 13, usually made of metal, adapted to hold the insulation in position about the pipe. Cooperating with the retaining means 12 there is a positioning member 14 adapted to support and locate the retaining strap with respect to the pipe in accordance with the thickness of the covering 11 which is secured by the retaining means. It will, of course, be obvious that to bring the plate 14 in contact with the pipe, a transversely extending slot corresponding to the thickness of the plate must be made in the insulation. With such construction, the insulation will serve to hold the plate in upright position with respect to the pipe. Secured to the edge of the plate 14 at right angles thereto, and conforming to the curvature of the insulation, is a second plate 15 which forms the seat against which the retaining strap 12 bears to prevent the strap from compressing or cutting through the insulation and to prevent the insulation from bellying away from the pipe at the lower portion thereof.

While the ends of the retaining strap 12 may be fastened together independently of the plate 14, I prefer to provide means in connection with said plate to which the ends of the straps may be anchored and which will further enable the ends of the straps to be conveniently detached therefrom when it is necessary to lengthen or shorten the straps in conformity with changes in condition of the insulation. To accomplish this purpose, I have extended the ends 16 of the plate 15 beyond the longitudinal extremities of the plate 14 and bent said ends back on themselves as shown in Fig. 2. Slot 17, conforming to the width of the straps 12, is provided along the bend for the purpose of receiving the ends of the strap. By providing suitable apertures 18 in the bent-back end and corresponding apertures in the main portion of the plate opposite the end, it will be obvious that retaining pins such as 19 may be driven through the apertures in the end of the plate and the main body thereof to firmly secure the end of the strap which lies between the two. The ends of the pin may project into the body of the insulation to prevent them from easily pulling out, and to further secure said pins in place the ends 20 of the straps may be bent over the heads of the pins as shown in Fig. 2. It will be clear that with this construction, the pins may be easily removed for the purpose of lengthening or shortening the strap and the pin driven through a new position in the strap to again securely fasten the same to the plate 15.

Although any suitable materials may be used in forming my retaining means, I have found that one-eighth inch steel is admirably suited for the positioning plate 14 and that one-sixteenth inch steel may be suitably bent to form the plate 15 which is secured to the edge of the plate 14 at right angles thereto by any suitable means such as riveting or welding. The retaining straps 12 are preferably made of flexible brass.

Having now described my invention in detail, it will be obvious to those skilled in the art that despite the simplicity of construction of my invention, it fills a want long felt in the art. While the details of construction shown in the accompanying drawings are well adapted for most purposes, such as retaining heat insulating coverings on pipes, it is clear that changes in formation and dimensions of the various parts may be readily made in accordance with the particular structure with which the retaining device is to be used without departing from the spirit of my invention.

What I claim is:

1. In combination, a pipe insulation surrounding said pipe, a rigid member seating on the pipe and extending outwardly through the insulation to the outer periphery thereof, and a retaining strap surrounding the insulation, said strap being supported by said rigid member.

2. In combination, a pipe insulation surrounding said pipe, a rigid member seating on the pipe and extending outwardly through the insulation to the outer periphery thereof, and a retaining strap surrounding the insulation, said strap being supported by and secured to said rigid member.

3. In combination, a pipe, insulation surrounding said pipe, a rigid plate seating on the pipe transversely thereof and extending perpendicularly from the pipe outwardly through a suitable cut in the insulation, the outer edge of said plate being shaped to conform to the outer periphery of the insulation, a second plate bent to conform to the outer periphery of the insulation supported by and secured to the edge of the first-mentioned plate at right angles thereto, and a retaining strap extending circumferentially of the insulation supported by and secured to the second-mentioned plate.

4. In combination, a pipe, a flexible covering surrounding said pipe, a retaining strap surrounding said covering and means supported by the pipe for preventing the retaining strap from deforming said covering.

5. In combination, a pipe, insulation surrounding said pipe, a rigid member seating on the pipe extending outwardly therefrom, and a retaining strap surrounding the insulation supported by the rigid member.

6. In combination, a pipe, insulation surrounding said pipe, a rigid member seating on the pipe, and a retaining strap surrounding the insulation supported by and secured to the rigid member.

7. In combination, a pipe, insulation surrounding said pipe, a rigid plate seating transversely of the pipe, and a retaining strap surrounding the insulation supported by said plate.

8. In combination, a pipe, insulation surrounding said pipe, a rigid plate seating transversely of the pipe, a second rigid plate supported by and at right angles to the first plate, and a retaining strap surrounding the insulation supported by the second plate.

9. In combination, a pipe, insulation surrounding said pipe, a rigid plate seating transversely of the pipe conforming in shape to the outer periphery of the insulation and a retaining strap surrounding the insulation supported by said plate.

In testimony whereof, I affix my signature.

MANUEL H. GYSLING.